May 9, 1939. C. L. EKSERGIAN 2,157,649
COMBINED BODY AND CHASSIS CONSTRUCTION
Original Filed May 31, 1934  3 Sheets-Sheet 1

INVENTOR.
CAROLUS L. EKSERGIAN.
BY
*John P. Tarlor*
ATTORNEY

May 9, 1939.  C. L. EKSERGIAN  2,157,649
COMBINED BODY AND CHASSIS CONSTRUCTION
Original Filed May 31, 1934  3 Sheets-Sheet 2

INVENTOR.
CAROLUS L. EKSERGIAN.
BY
John P. Tarbox
ATTORNEY.

May 9, 1939.　　　C. L. EKSERGIAN　　　2,157,649
COMBINED BODY AND CHASSIS CONSTRUCTION
Original Filed May 31, 1934　　　3 Sheets-Sheet 3
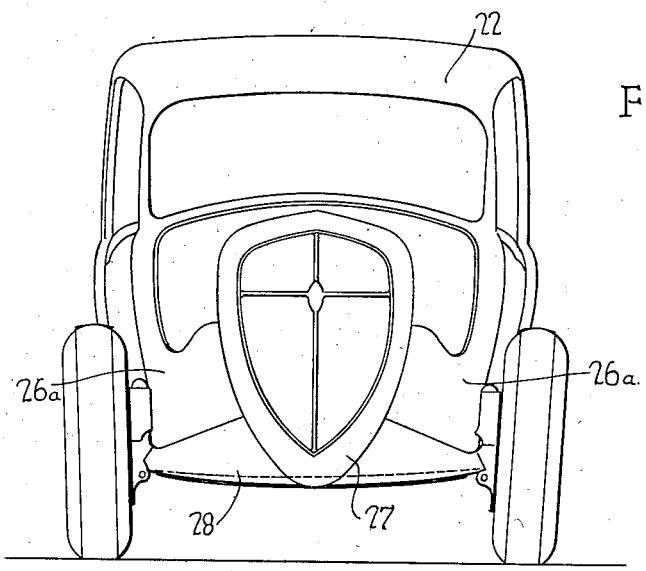
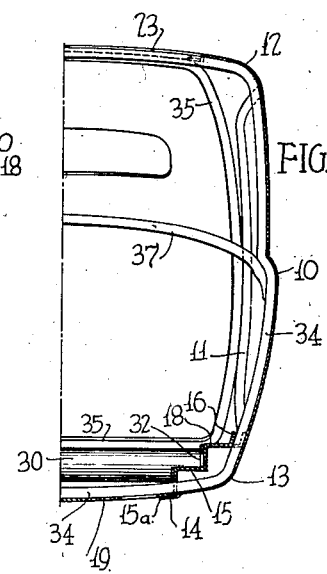
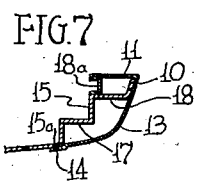
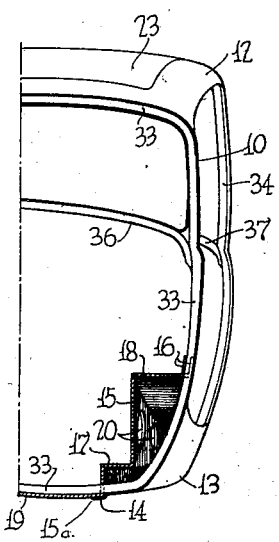
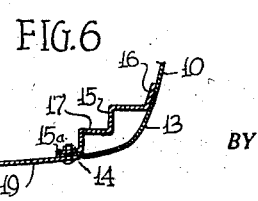
INVENTOR.
CAROLUS L. EKSERGIAN
BY
John P. Fairbox
ATTORNEY.

Patented May 9, 1939

2,157,649

UNITED STATES PATENT OFFICE 2,157,649

COMBINED BODY AND CHASSIS CONSTRUCTION

Carolus L. Eksergian, Detroit, Mich., assignor to Edw. G. Budd Manufacturing Company, Philadelphia, Pa., a corporation of Pennsylvania Application May 31, 1934, Serial No. 728,362
Renewed June 17, 1938

34 Claims. (Cl. 296—28)

The invention relates to vehicle bodies and more particularly to a vehicle body combining the body and chassis functions in one unitary structure.

The invention has for its main objects the simplification of the vehicle structure, the effective stream lining of its parts, the lowering of its center of gravity, reduction in weight, and ease of fabrication and assembly.

To these and other ends the outer paneling of the body and chassis construction of my invention is preferably built up of large sheet metal stampings and the paneling and main longitudinal combined body and chassis sills are so combined as to form therewith deep box section structures extending at least from the front axle suspension to the rear axle suspension. These box section side members, to more effectively stream line the under parts and to interconnect them, are connected by a transversely extending bottom plate and by additional transverse interconnections in the cowl and front and rear seat regions. To increase the strength in front of the cowl and in the front post regions, the box section structures are in this region, where the engine and front seat loads are taken, made vertically of maximum depth, and the transverse cowl structure interconnecting the sides of the body in this region, is also preferably a vertically deep beam of hollow structure affording with the deep side sill structure a substantially U form frame in plan of vertically deep hollow and/or box section members forwardly of the front door openings.

Other and further objects and advantages and the structures whereby they are attained will become more fully apparent from the following detailed description when read in connection with the drawings forming a part hereof.

In the drawings,

Fig. 3 is a view in front elevation showing the front wheel suspension.

Figs. 4 and 5 are transverse sectional views of one half of the body structure, the section of Fig. 4 being taken in the region of the front or A posts and the section of Fig. 5 being taken in the region slightly forward of the B—C posts between the door openings, Fig. 6 is a detail sectional view through the box section side sill showing a slightly modified construction.

Fig. 7 is a detail transverse sectional view taken through the threshold of a door way opening.

Figure 1:
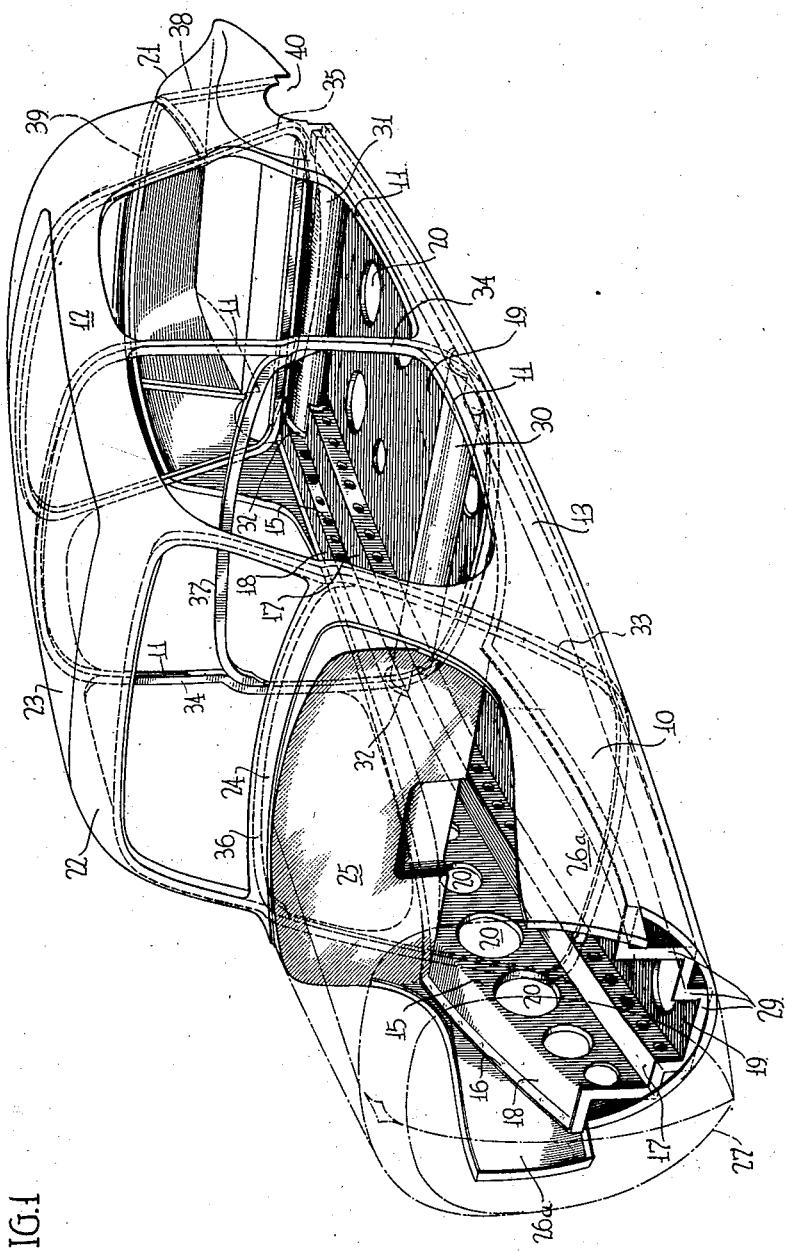
Fig. 1 is a perspective view as seen from the front and one side of the improved combined body and chassis construction according to the invention, parts of the vehicle being shown in phantom.

In the drawings the invention is shown applied to a sedan type of body, but it is applicable also to other types. The invention lends itself particularly to utilization in connection with bodies in which the outer paneling is formed of large unitary stampings, and in the form of the invention shown, the sides of the body including the sides of the cowl and the lower portion of the hood extending forwardly of the cowl are made as unitary stampings including the door and window openings and the rear wheel housing. These side panels are designated generally by the numeral 10. They are conformed to the contour of the side of the body and curved in longitudinal and transverse directions and are flanged inwardly at the door openings as at 11 to form the jamb faces of the door openings. At the top they are extended inwardly on a smooth rounded curve of large radius to form the side quarters 12 of the roof and at the bottom they are extended below the thresholds on well rounded large radius curves to form lower portions 13 conforming to the curvature of the lower side of the combined body and chassis and extending at least from the front wheel suspension to the rear wheel suspension. The lower margins of the portions 13 are turned in at 14 substantially in the plane of the bottom of the structure and terminate some distance inwardly of the side walls of the body structure.

Combined with these side panels 10 to form therewith the main longitudinal side sills of the combined body and chassis structure are angular section sill members 15 which may be of the same or of somewhat heavier gauge metal than the paneling.

These angular sill members have their lower margins at 15a conforming to the lower margins 14 of the side panels and their upper margins at 16 flanged and conforming to the panelings and extending longitudinally like the paneling at least from the front wheel suspension to the rear wheel suspension. The overlapping marginal portions at 15a and 16 of the sills 14 are secured to the paneling throughout as by spot welding to form box section structures from front wheel suspension to rear wheel suspension which form the main strength members of the structure.

The sill members 15 are throughout of double angle form providing a lower horizontal ledge as 17 adapted to receive and support the flooring and an upper horizontal ledge as 18 adapted to receive and support the seat structures and at the front the motor mounting. In the thresholds, the inturned flange 11 of the paneling may be secured to the ledge 18 by suitable spacing means, such as the channel member 18a shown in Fig. 7.

Figure 2:
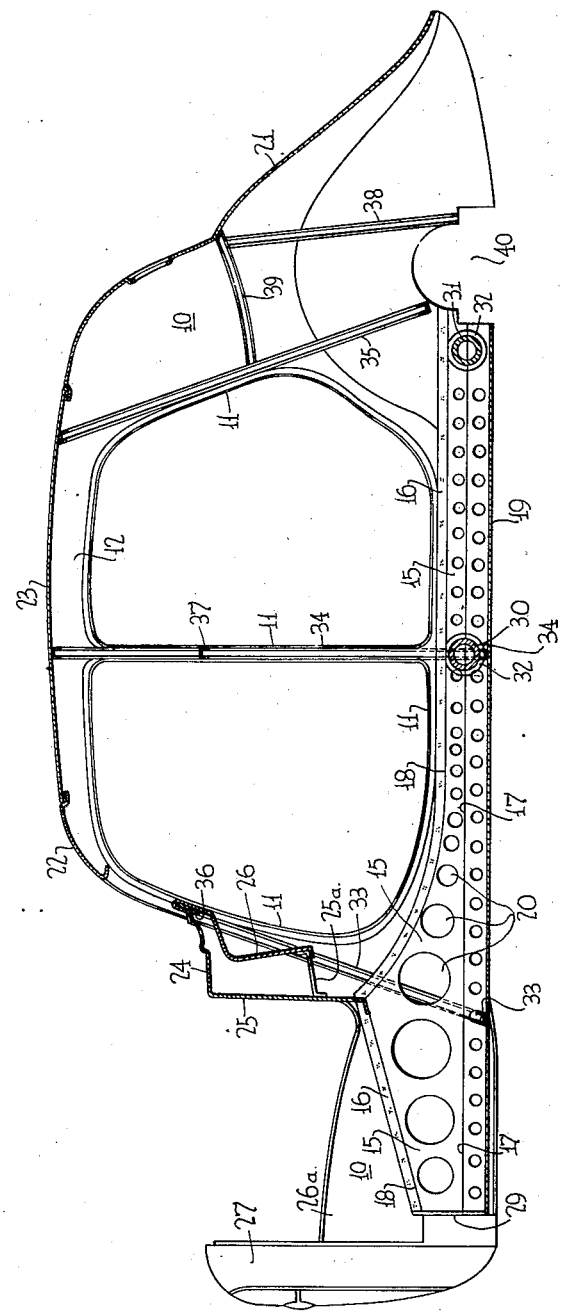
Fig. 2 is a central vertical longitudinal sectional view thereof.

As clearly appears from Figs. 1 and 2, the box section side sill structures so formed are vertically very deep from the front wheel suspension to the region of the front or A posts and increase in depth from the front to said front post region and from that point rearwardly are of decreased depth to their terminus at the rear wheel suspension, the depth of said box section side sill structures in the front or A-post region being at least twice as great as their depth some distance rearwardly thereof, and, in fact, their depth throughout their entire extent forwardly of said front or A-post region substantially exceeding their depth some distance rearwardly thereof. This construction provides the maximum strength where it is needed to support the concentrated weight of the motor and the occupants of the front seat.

To close the bottom of the combined body and chassis structure and give the underframe a stream line contour, and also to tie together the box section side sills at their lower region, a transversely curved bottom panel 19 is provided and according to the form of the invention shown in Figs. 1 to 5, inclusive, this bottom panel is formed as a unitary stamping with the side sill members 15. To lighten this stamping and also to provide openings affording more ready access to certain parts, openings indicated at 20 may be provided.

In some cases, and to provide for still more ready access to parts under the flooring, the bottom panel may be made a separate panel as 19' separate from the sills 15' and bolted or otherwise removably secured to the inwardly extending edge flanges 14, 15a of the box section side sill structures, as shown, for example, in Fig. 6, the parts corresponding to parts shown in the other figures being designated by the same reference characters, but the separately formed stepped sill member and the floor panel being designated respectively 15' and 19'.

The side panels are transversely connected at the back by the usual back panel 21, Fig. 2, and above the windshield opening by the transversely extending windshield header panel 22, between which extends the usual separate roof panel 23 interconnecting the tops of the side panels.

The side portions of the cowl paneling are interconnected by the cowl top panel 24, the shroud pan 25 and the instrument board panel 26 which together form a vertically deep hollow section beam structure strongly interconnecting the side paneling and framing. The lower edge of the instrument board panel may be joined by bracing 25a to the shroud pan 25, making this transverse beam structure in effect a box section structure. The shroud pan 25 is extended down to and joined to the top of the box section side sill structure, so that the cross bracing structure in the region of the A posts and cowl forms with the forwardly extending vertically deep box section sill structures of a depth in the A-post region at least half the vertical height of the cowl, vertically deep beam structures of generally U section in plan (see Figs. 1 and 2) which greatly strengthens the structure in this region, and permits the use of light gauge sheet metal, while yet attaining adequate strength. The motor is received between the sides of the U-section structure and supported by transverse seats on said sides.

The upper portion 26a of the side stampings forming the hood sides flanking the motor mounting are extended forwardly to the radiator shell 27, but the lower portions thereof and side sills 15 and bottom panel 19 terminate short of the radiator shell leaving a transverse passageway to receive the fixed axle 28 from which the front wheels are carried, preferably by individual springing. This axle is a hollow section sheet metal structure, the central portion of which is of rectangular cross section and fits against the flanged front ends of the lower portion of the side panels, the sills and the bottom panel and is rigidly secured through these flanges to the front end of the combined body and chassis construction.

The flanges just referred to appear most clearly in Fig. 1 and are there designated generally by the numeral 29. The rear wheel suspension, not shown, may be secured to the underframe structure in a similar or any other approved manner.

The underframe of the combined body and chassis structure is further reinforced and strengthened by cross braces, as 30 and 31 of tubular form interconnecting the box section side sill structures in the regions of the front and rear seat structures, not shown. These tubular cross members have their ends conforming to the stepped construction of the side sills 15 and are flanged at such ends as indicated at 32, and secured to the side sills through such flanges as by welding. These tubular cross members add materially to the strength of the underframe and resist twisting strains imposed thereon.

Adjacent the door openings, the paneling and underframe may be additionally reinforced by transverse frame members of channel section indicated respectively by the reference characters 33, 34 and 35, these transverse frames extending continuously across the bottom, up along the sides of the door openings and across the top. They not only reinforce the body superstructure, but pass through the box section side sill structures and are secured to the outer wall or paneling so that the box section side sills and transverse frames mutually interbrace each other, and the frames form additional transverse interconnecting means for the underframe. At the lower edge of the windshield opening, the side portions of the frame 33 are further interbraced by a transversely extending downwardly facing channel member 36 which reinforces the rear edge of the cowl and is secured thereto.

The intermediate transverse frame 34 has its vertical side portions interconnected by a similar member 37 which also serves as a seat back support for the front seat.

Additional transverse and horizontal braces as 38 and 39, (see Fig. 2), reinforce the paneling in the rear of the rear door opening over the rear axle the location of which is indicated by the generally semicircular cut outs shown at 40 in Figs. 1 and 2.

While I have hereinbefore described a specific form of the invention, it will be understood that changes and modifications may be made without departing from the spirit of the invention as set forth in the claims appended hereto.

What I claim is:

1. In a combined body and chassis construction, body side panels extending continuously at least from the front wheel suspension to the rear wheel suspension, and inner angular cross section side sill elements of similar longitudinal extent forming with the body side panels closed box section combined body and chassis sill structures connected by cross connections and adapted to carry the motor, flooring and seat structures, said sill elements being vertically at least twice as deep in the region of the front posts as their depth some distance rearwardly of said region.

2. In a combined body and chassis construction, a full height side panel including the door openings and extending at least from a point adjacent the front wheel suspension rearwardly to the rear wheel suspension, in combination with a sill element of angular cross section having ledges for supporting the motor, flooring and seat structures, and having its margins conforming to the lower portions of the body side panel and secured thereto to form a box section combined body and chassis sill structure therewith, the floor supporting ledge being arranged above the bottom of said sill element.

3. A combined body and chassis structure comprising a longitudinally curved outer contouring panel extending at least from the rear wheel suspension to the front wheel suspension, said panel extending in vertical direction at least from the bottom of a door opening downwardly and inwardly in transversely curved outline, and a side sill member of angular cross section having its margins secured directly to said panel in the region of transverse curvature to form therewith a box section combined body and chassis sill structure.

4. A combined body and chassis construction comprising an outer contouring bottom panel and lateral edge extensions of said panel of outwardly presenting angular cross sectional form extending from at least the front wheel suspension to the rear wheel suspension, and an outer contouring side panel having inwardly extending threshold portions and portions extending downwardly from the thresholds of the doors and secured directly to the adjacent lateral edge extension of said bottom panel to form therewith box section combined body and chassis sill structures.

5. A one piece bottom and side sill structure for combined chassis and body constructions comprising a central transversely extending bottom portion extending longitudinally at least from the front wheel suspension to the rear wheel suspension and having downwardly and outwardly presenting angular cross section marginal side portions for securement directly to the side paneling of the body structure to form box section structures therewith.

6. A one piece bottom and side sill structure for combined chassis and body constructions comprising a central transversely extending bottom portion extending longitudinally at least from the front wheel suspension to the rear wheel suspension and having downwardly and outwardly presenting angular cross section marginal side portions conforming to the lower side portions of the body and adapted for securement directly to the side paneling of the body structure to form box section structures therewith.

7. A body and chassis structure having box section side sills curved to conform to the sides and bottom of said structure and passing below the thresholds of the doors and extended forwardly to the front wheel suspension and of very substantially greater vertical depth between the region of the front posts and the front wheel suspension than their depth some distance rearwardly of said front post region, and cross connections between said sills including a substantially continuous bottom, and hollow section cross members arranged above said bottom and having their ends secured in abutting relation to said box section side sill in the locations of the seat structures.

8. A combined body and chassis construction comprising bottom side members of box section rapidly increasing in depth from the front wheel suspension to the front post region, and of a maximum depth in said region at least twice as great as their depth some distance rearwardly of said region, and a transverse cowl structure interconnecting said members and comprising in longitudinal section a vertically deep hollow cross section comparable in depth to the depth of said box section side members in the region of the front posts.

9. A combined body and chassis construction comprising longitudinally curved side sills of angular cross section extending at least from the front wheel suspension to the rear wheel suspension and secured to the side paneling of the body to form box sections structures therewith, said sills having an upper ledge for supporting the seat structures and a lower flooring supporting ledge.

10. A combined body and chassis construction having side panels extending from the roof to below the door openings and forming, with angular side sill members below the door openings, box section structures, in combination with continuous closed section reinforcing transverse braces extending through and secured to said box section structures and arranged at the margins of the door openings.

11. A combined body and chassis construction having a transversely curved paneling conforming to the bottom of said structure and inside reinforcing members secured in their edges to said paneling and forming therewith box section combined body and chassis sill structures, said paneling and members being flanged in their front ends, said flanged ends forming a flat plane surface adapted to receive the fixed axle of the front wheel suspension directly thereagainst for securement thereto.

12. A combined body and chassis construction comprising a forward portion having side sill portions extending from the front post region to the front wheel suspension and of a depth vertically at least half the vertical height of the cowl, said side sill portions being transversely interconnected in the cowl region by a vertically deep hollow section beam structure including the top of the cowl and of substantially box section and forming with the deep side sill portions a substantially U-form framing in plan having a space between the sides thereof to receive and support the motor.

13. A combined body and chassis construction having side panels curved inwardly at the bottom and transversely interconnected by a bottom panel, longitudinal reinforcing members of angle section having their margins secured to the panels to form box section structures therewith, and a transverse frame extending through said box section structures and across the bottom and secured in said regions to the side and bottom panels.

14. A combined body and chassis construction comprising side panels and reinforcing members joined together to form box section combined body and chassis side sill structures extending continuously through the thresholds and therebeyond a distance sufficient to receive and support a motor, and a cross connecting member of closed cross section form having its end mating with and secured to the inner faces of said box section side sill structures, said member being arranged to lie in the region of a seat structure.

15. A combined body and chassis construction comprising side panels and angular section reinforcing members joined to said side panels to form therewith box sections side sill structures extending continuously through the thresholds and therebeyond a distance sufficient to receive and support a motor, and cross connections between said sill structures including closed cross section cross members having their ends formed to mate with the side sills and rigidly secured thereto through said ends, the tubular cross members being arranged to lie in the regions of the front and rear seat structures.

16. In a vehicle construction, body sides including sheet metal panels forming the outer contour of the body and extended forwardly to form the sides of the cowl and the lower portions of the hood forwardly of the cowl, and longitudinal side sills of open sided outwardly presenting form secured to the lower margins of said panels to form box section combined body and chassis sill structures therewith, said box section sill members increasing substantially in depth from their front ends to the region of the A-posts.

17. In a combined body and chassis construction, side panels forming the sides of the cowl and extended forwardly therebeyond, longitudinal sill members of open sided outwardly facing section secured to the lower margins of said panels to form therewith box section combined body and chassis sill members in the cowl region and forwardly thereof, a cowl top panel connecting the sides of the cowl, and vertically deep panels connected to the front and rear margins of the cowl top panel and to the side panels.

18. In a combined body and chassis construction, side panels forming the sides of the cowl and extended forwardly therebeyond, and longitudinal sill members of open sided outwardly facing section secured to the lower margins of said panels to form therewith continuous forwardly projecting box section structures to support the motor and be supported by the front wheel suspension, said box section structures increasing substantially in vertical depth from their front ends to A-post region.

19. In a combined automobile body and chassis construction, longitudinal side sill members of angle section, of a longitudinal extent passing through the thresholds of the doors and extended therebeyond at at least one end a substantial distance, hollow section transverse members interconnecting said side sill members, and outer body side panels conforming to the contour of the body and cooperating with and secured to said side sill members, through portions corresponding in longitudinal extent to the extent of the sill members through and beyond the thresholds, to form hollow, closed, box section structures extending through the thresholds of the doors and therebeyond, at at least one end, a distance sufficient to receive and support a motor.

20. In a combined automobile body and chassis construction, an underframe including longitudinal side sill members of open sided hollow-section of a longitudinal extent passing through the thresholds of the doors and extended therebeyond at at least one end a substantial distance, hollow-section transverse members interconnecting said sill members and outer body side panels conforming to the contour of the body and serving at their lower margins to close the hollow-section longitudinal sill members and secured thereto, through portions corresponding in longitudinal extent to the extent of the sill members through and beyond the thresholds, to form closed box section structures therewith of a longitudinal extent passing through the thresholds of the doors and therebeyond, at at least one end, a distance sufficient to receive and support a motor.

21. In a vehicle construction, an underframe including a longitudinal side sill of hollow outwardly open sided section extending through the door thresholds and a substantial distance therebeyond, in combination with outer body side wall paneling conforming to the contour of the body and having its lower margin including a threshold portion arranged to cover the open side of said sill and secured thereto to form with said sill a combined body and chassis sill structure of closed box section extending through the door thresholds and therebeyond, at at least one end thereof, a distance sufficient to receive and support a motor.

22. In a vehicle construction, a combined body and chassis underframe including a longitudinal sill member of open sided, outwardly presenting section, in combination with a unitary body side wall panel contouring the body and formed adjacent its lower margin including a threshold portion to cover the open side of said outwardly presenting sill member and secured thereto to form therewith a combined body and chassis sill of box section extending through the major portion of the length of the vehicle including extension through the threshold region and therebeyond, at at least one end thereof, a distance sufficient to receive and support a motor.

23. In a vehicle construction, a chassis structure including a chassis sill member of angular section outwardly presented, in combination with a unitary body outer side panel formed in its lower margin with a threshold portion of inwardly presenting hollow section, said angular and hollow section parts being joined in final assembly to form a box section combined body and chassis sill structure.

24. In a vehicle construction, a chassis including a chassis sill structure of hollow open sided section, in combination with a unitary body side wall structure formed adjacent its lower margins with threshold portions projecting laterally and overlying said sill structure, and the lower margins of the side wall structure being adapted when finally assembled to cover the open side of said sill structure and form therewith a combined body and chassis sill structure of box section.

25. In a vehicle construction, a chassis including an open sided outwardly presenting chassis sill member of hollow section, in combination with a unitary body side wall structure formed adjacent its lower margins with threshold portions projecting laterally and overlying said sill structure, and the lower margins of the side wall structure being adapted when finally assembled to cover the open outwardly presenting side of said sill and form with said sill a combined body and chassis sill of box section.

26. In a combined body and chassis construction, a unitary sheet metal bottom panel extending laterally from side to side of the body and longitudinally for the greater portion of the length of the body, said bottom panel conforming in its lateral margins to the contour of the lower side of the body and formed at said margins with generally vertically extending integrally formed flanges, in combination with a body superstructure having sheet metal side panels having portions overlapping and secured to said bottom panel adjacent the top and bottom of said vertically extending side flanges thereof but spaced from said flanges between said top and bottom overlap, thereby forming therewith box-section combined body and chassis sill structures.

27. A combined body and chassis construction according to claim 26 in which the vertically extending side flanges of the bottom panel are transversely interbraced by hollow-section transverse members.

28. A combined body and chassis construction according to claim 26 in which the vertically extending flanges of the bottom panel are interbraced by closed-section transverse bracing members.

29. A combined vehicle body and chassis construction comprised of body side wall panels and side sill members forming, with the margins of said side wall panels, box-section structures, said box-section structures extending through the thresholds of the doors and therebeyond toward one end of the vehicle a distance sufficient to receive and support a motor beyond said thresholds.

30. In a motor vehicle, a combined body and chassis frame including side sills of generally outwardly presenting channel section, a plurality of panel elements secured together to form a body super-structure, said panel elements being downwardly extended at the sides to overlap the outer sides of the chassis sills and directly secured thereto to form box-section structures with the outwardly presenting channels thereof, and transversely extending seating means on the inner portions of said box-section structures for providing a support for the motor of the vehicle.

31. A combined body and chassis construction embodying independently fabricated side and bottom panels joined together and reinforced in the region of joinder through a hollow box section sill structure constituted by at least two longitudinally extending section forming elements joined together along lines of overlap vertically spaced apart and having their main bodies spaced apart between said lines of overlap, characterized in that one of said longitudinally extending elements constituting the box section structure is a flange in one piece with the bottom panel.

32. A combined body and chassis construction according to claim 31 in which the vehicle body is provided with a doorway having a threshold, the said box section sill structure is extended at one end at least a sufficient distance beyond the threshold to constitute a substantial part of the frame work supporting the body from the running gear, and the outer section forming element is the side panel.

33. A combined body and chassis construction according to claim 31 in which such box section sill structures are located one on each side of the vehicle, and are directly interconnected by transversely extending closed cross section structures longitudinally widely spaced apart.

34. In a combined body and chassis construction embodying independently fabricated side and bottom panels reinforced in the region of a lower side margin of the body through a hollow box section sill structure constituted by at least two longitudinally extending section forming elements joined together along lines being spaced apart and having their main bodies spaced apart between said lines of joinder, the one of said longitudinally extending elements constituting the box section structure being a flange in one piece with said bottom panel, and the other of said elements being confined in the bottom region in transverse direction substantially to the transverse extent of said box section sill structure.

CAROLUS L. EKSERGIAN.